United States Patent
Nonaka

(10) Patent No.: US 10,399,544 B2
(45) Date of Patent: Sep. 3, 2019

(54) VEHICLE CONTROL SYSTEM

(71) Applicant: MITSUBISHI JIDOSHA KOGYO KABUSHIKI KAISHA, Tokyo (JP)

(72) Inventor: Takashi Nonaka, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 15/460,553

(22) Filed: Mar. 16, 2017

(65) Prior Publication Data

US 2017/0327087 A1 Nov. 16, 2017

(30) Foreign Application Priority Data

May 13, 2016 (JP) .................. 2016-097235

(51) Int. Cl.
*B60R 25/30* (2013.01)
*H04M 1/60* (2006.01)
*B60W 50/00* (2006.01)
*G05D 1/02* (2006.01)
*H04M 1/725* (2006.01)

(52) U.S. Cl.
CPC .......... *B60R 25/30* (2013.01); *H04M 1/6075* (2013.01); *B60W 2050/0064* (2013.01); *G05D 1/0276* (2013.01); *H04M 1/72577* (2013.01)

(58) Field of Classification Search
CPC ......... H04M 1/72577; H04M 1/72563; H04M 1/72569; H04M 1/6033; H04M 1/6041; H04M 1/6075; H04W 48/00; H04W 48/02; H04W 48/04; H04W 48/06; G05D 1/021; G05D 1/0276; G05D 1/028; G05D 1/0285; G05D 1/03; G05D 1/0011; G05D 1/0016; G05D 1/0022; G05D 1/0038; G05D 1/0044; G05D 1/005; B60W 30/14; B60W 30/143; B60W 30/146; B60W 30/18009; B60W 2050/0064
See application file for complete search history.

(56) References Cited

U.S. PATENT DOCUMENTS

| | | | |
|---|---|---|---|
| 8,270,933 B2* | 9/2012 | Riemer | H04M 1/72577 455/345 |
| 9,110,774 B1* | 8/2015 | Bonn | G06F 17/00 |
| 9,294,603 B2* | 3/2016 | Fischer | G07C 9/00119 |
| 9,311,762 B2* | 4/2016 | Godley | G05D 1/0011 |
| 9,444,943 B2* | 9/2016 | Shin | H04W 4/16 |
| 2004/0204161 A1* | 10/2004 | Yamato | H04M 1/6091 455/569.1 |

(Continued)

FOREIGN PATENT DOCUMENTS

JP 2015-154333 A 8/2015

*Primary Examiner* — Thomas G Black
*Assistant Examiner* — Sara J Lewandroski
(74) *Attorney, Agent, or Firm* — Birch, Stewart, Kolasch & Birch, LLP

(57) ABSTRACT

A vehicle control system for controlling a vehicle based on information from a mobile communication terminal includes an operation restricting portion that restricts operation to the mobile communication terminal, a determination portion that determines a restriction state of the operation to the mobile communication terminal imposed by the operation restricting portion, and a vehicle control portion that controls the vehicle in accordance with the determination of the determination portion.

12 Claims, 2 Drawing Sheets

(56) References Cited

U.S. PATENT DOCUMENTS

| | | | |
|---|---|---|---|
| 2010/0004838 A1* | 1/2010 | Georgis | G08G 1/096725 |
| | | | 701/70 |
| 2014/0277843 A1* | 9/2014 | Langlois | H04M 1/6091 |
| | | | 701/2 |
| 2015/0154728 A1* | 6/2015 | Nara | G06F 3/0488 |
| | | | 345/157 |
| 2015/0246676 A1* | 9/2015 | Keren | B60W 30/146 |
| | | | 701/93 |
| 2015/0306956 A1* | 10/2015 | Nagashima | B60K 26/02 |
| | | | 180/335 |
| 2016/0012795 A1* | 1/2016 | Banski | G06F 3/14 |
| | | | 345/520 |
| 2016/0212253 A1* | 7/2016 | Akama | G01C 21/3664 |
| 2016/0227020 A1* | 8/2016 | Tadayon | H04W 4/50 |
| 2016/0252144 A1* | 9/2016 | Kajino | B60R 25/04 |
| | | | 701/67 |
| 2017/0054842 A1* | 2/2017 | Choi | H04W 4/027 |
| 2017/0120864 A1* | 5/2017 | Fischer | B60K 35/00 |
| 2017/0279957 A1* | 9/2017 | Abramson et al. | |
| | | | H04M 1/72577 |
| 2017/0303185 A1* | 10/2017 | Nathan | G08B 21/18 |
| 2017/0318534 A1* | 11/2017 | Takatsuji | H04W 52/0229 |
| 2018/0034504 A1* | 2/2018 | Kirk | G07C 5/008 |
| 2018/0124233 A1* | 5/2018 | Abramson | G06F 3/005 |

* cited by examiner

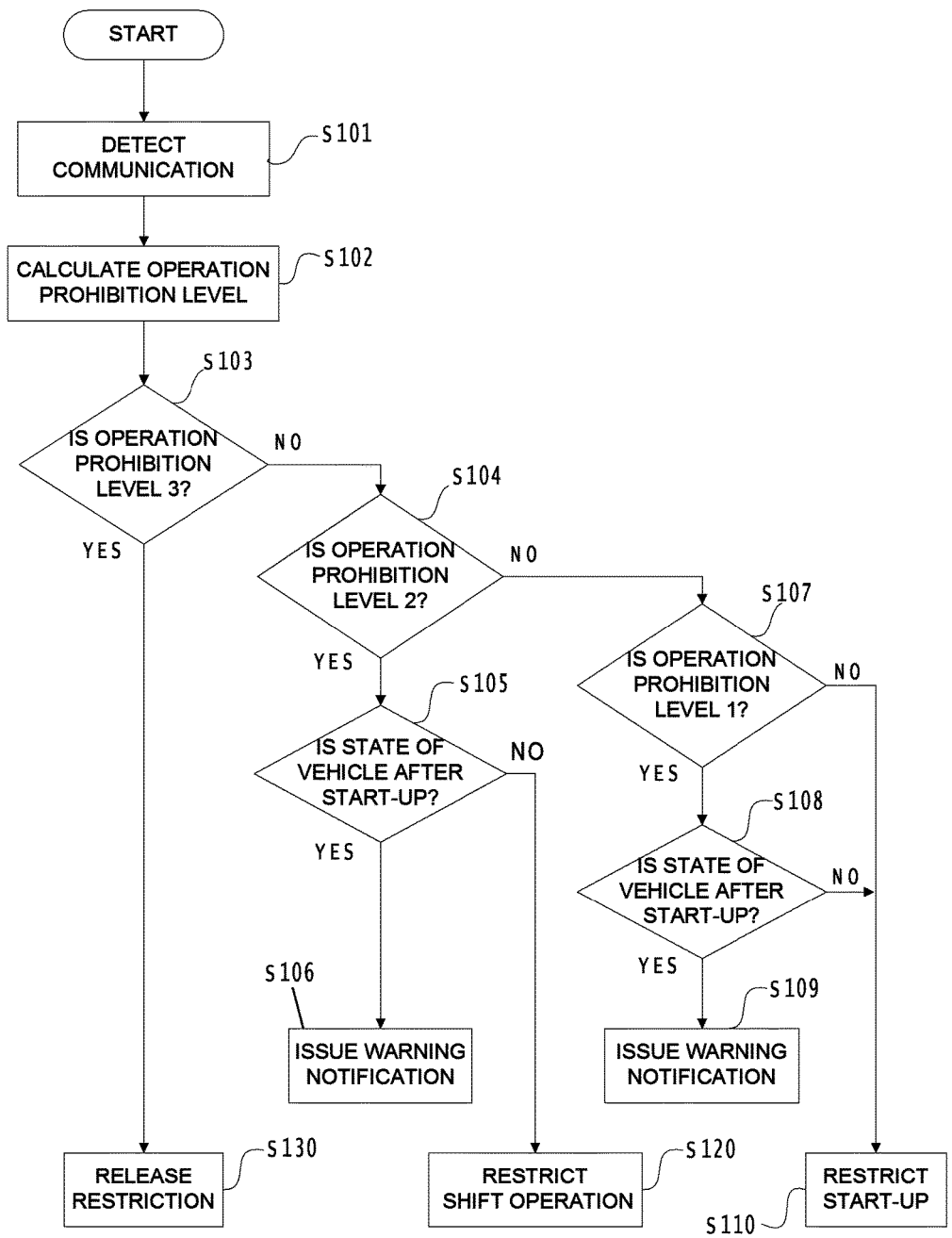

VEHICLE CONTROL SYSTEM

CROSS REFERENCE TO RELATED APPLICATION

This application is based on Japanese Patent Application No. 2016-097235 filed on May 13, 2016, the contents of which are incorporated herein by reference.

BACKGROUND OF THE INVENTION

1. Technical Field

The present invention relates to a vehicle control system.

2. Background Art

With the spread of mobile communication terminals such as smartphones, a vehicle control system which restricts operation to a mobile communication terminal by a driver of a vehicle during running of the vehicle so that the driver can concentrate on driving operation of the vehicle has been known (e.g. JP-A-2015-154333).

However, recently, mobile communication terminals have variety of functions. it is difficult to enjoy convenience while restricting the operation to the mobile communication terminals during driving only by restricting the operation of the mobile communication terminal.

The invention has been made based on the aforementioned matter. An object of the invention is to provide a vehicle control system for properly restricting operation to a mobile communication terminal by a driver.

BRIEF DESCRIPTION OF DRAWINGS

FIG. 3 is a flow chart showing an example of operation of the vehicle control system shown in FIG. 1.

DESCRIPTION OF PREFERRED EMBODIMENT

Figure 1:
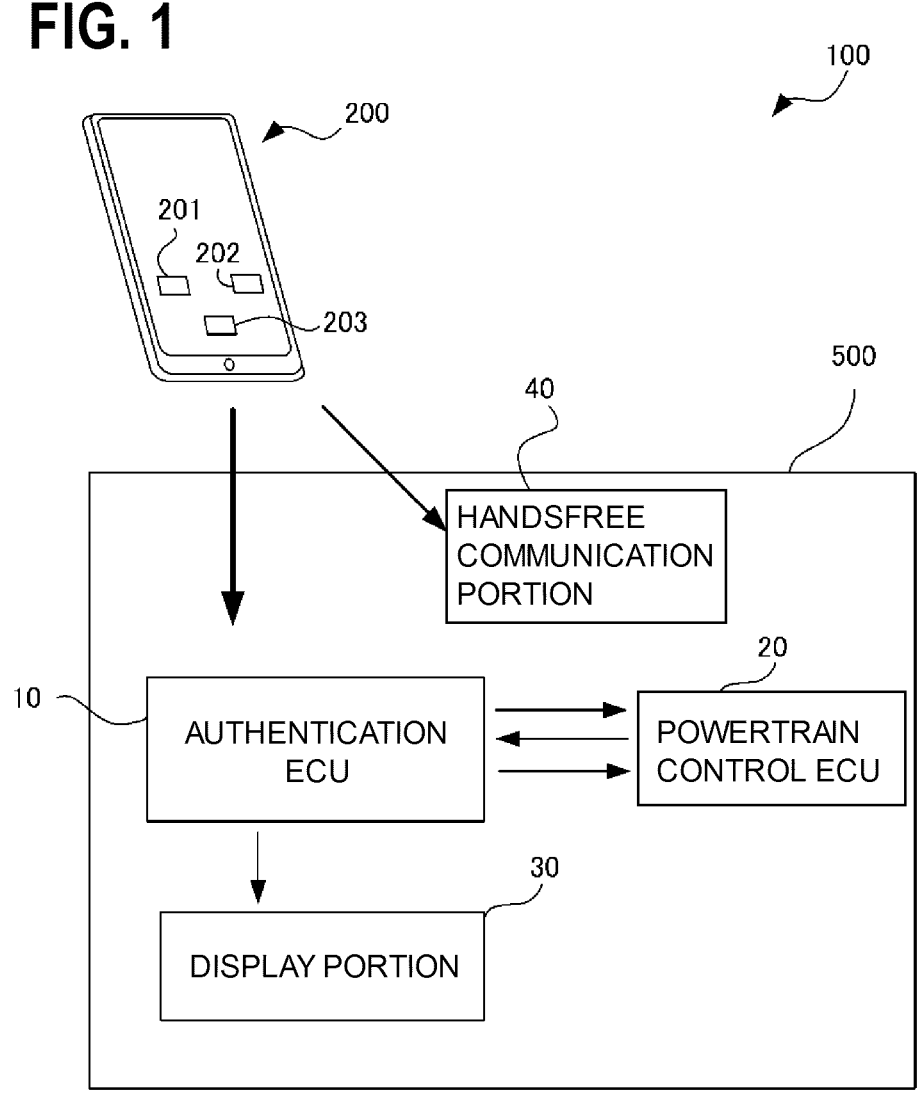
FIG. 1 is an overall configuration view showing an example of a vehicle control system as an embodiment of the invention.

As an embodiment of the invention, a vehicle 500 in which a vehicle control system 100 shown in FIG. 1 is mounted will be described below.

The vehicle control system 100 has an authentication ECU (Electronic Control Unit) 10 and a powertrain control ECU 20. The authentication ECU 10 authenticates a mobile terminal 200 which is a mobile communication terminal used by a driver of the vehicle 500. The powertrain control ECU 20 controls drive etc. of the vehicle 500.

The vehicle control system 100 has a display portion 30 and a handsfree communication portion 40. The display portion 30 serves as a display unit for informing the driver of various information about the vehicle 500. The handsfree communication portion 40 provides a handsfree calling function to the driver.

The mobile terminal 200 is a communication terminal having a communication function with the outside. For example, the communication terminal may be a smartphone or a tablet to be used by the driver.

In the embodiment, application software corresponding to the vehicle 500 has been installed in the mobile terminal 200 has an unlocking function and a locking function of the vehicle 500 through communication with the authentication ECU 10.

The mobile terminal 200 has an operation restricting portion 203, a prohibition degree calculating portion 202, and a communication portion 201. The operation restricting portion 203 restricts operation of the mobile terminal 200. The prohibition degree calculating portion 202 is a determination portion which calculates an operation prohibition level N as an operation prohibition degree based on an operation restriction state imposed by the operation restricting portion 203. The communication portion 201 transmits the operation prohibition level N calculated by the prohibition degree calculating portion 202 to the authentication ECU 10. For example, the operation restriction state includes a calling prohibition state in which only a calling function is restricted, a lock state in which all functions including functions by the installed software are restricted, and an application restriction state in which an operation of operation type software capable of communicating with the Internet by operation of a user is restricted.

That is, the operation restriction state shows a state in which the operation of the mobile terminal 200 is restricted by the function of the mobile terminal 200 per se or by the function etc. of the application software corresponding to the vehicle 500.

The operation prohibition level N is an index for indicating the operation restriction state of the mobile terminal 200. The operation prohibition level N is classified into the following levels in Table 1 which will be described later. In the Table 1, Level 3 indicates the lock state in which a largest number of functions are restricted, Level 2 indicates the application restriction state, Level 1 indicates the calling prohibition state, and Level 0 indicates an unrestricted state in which all the functions are not restricted. The operation prohibition level N is used here as the index for indicating the operation restriction state, and the invention is not limited to such a configuration. In the following description, the prohibition degree calculating portion 202 which is a determination portion is provided in the mobile terminal 200. The prohibition degree calculating portion 202 may be alternatively provided in the vehicle 500 so that the vehicle 500 can calculate an index for indicating an operation restriction state based on the operation restriction state transmitted from the mobile terminal 200.

The authentication ECU 10 is an authentication portion which establishes communication with the mobile terminal 200 moved into the vehicle 500 or to the vicinity of the vehicle 500 and performs mutual authentication with the mobile terminal 200 by pairing operation so that the operation of the vehicle 500 can be performed by the driver.

The powertrain control ECU 20 is a control portion which controls motive power of the vehicle 500 based on a driving operation to the vehicle performed by the driver. The driving operation includes an On/Off operation of a main motive power supply of the vehicle 500, a start-up operation of the vehicle 500, a shift change operation on a shift lever, and an operation on an accelerator, a brake, etc. during running.

Figure 2:
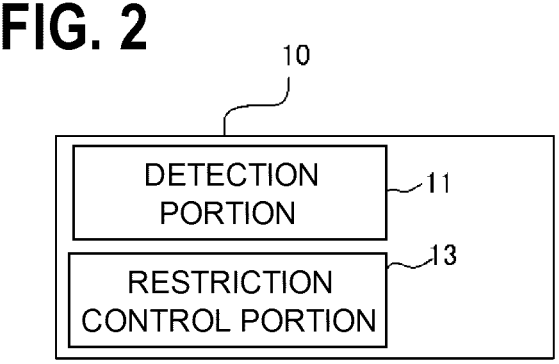
FIG. 2 is a functional block diagram showing an example of the configuration of an authentication portion shown in FIG. 1.

As shown in FIG. 2, the authentication ECU 10 has a detection portion 11 and a restriction control portion 13. The detection portion 11 is provided for detecting communication from the authenticated mobile terminal 200. The restriction control portion 13 is a vehicle control portion for restricting operation of the powertrain control ECU 20 in accordance with the operation prohibition level N transmitted from the mobile terminal 200.

The restriction control portion 13 sets a restriction degree on the driving operation of the vehicle 500 in accordance with the operation prohibition level N.

The restriction degree on the driving operation of the vehicle 500 is shown in Table 1. Permission/prohibition of shift operation of the vehicle 500, permission/prohibition of start-up (ReadyOn) of the vehicle 500, permission/prohibition of On of a main power supply (IG), and presence/absence of warning notification are determined by a combination of the operation prohibition level N and a vehicle state (after start-up/during stop).

As shown in the right side of Table 1, the state of the vehicle 500 in the embodiment is classified into a first state P, a second state Q, a third state R. The first state P is a state in which start-up of the vehicle 500 is prohibited. The second state Q is a state in which the start-up is permitted but shift change is prohibited and running of the vehicle 500 is restricted. The third state R is a state in which the running of the vehicle 500 is permitted.

vehicle 500, the detection portion 11 detects communication from the mobile terminal 200 (step S101).

Next, the prohibition degree calculating portion 202 performs calculation and determination of an operation prohibition degree N of the mobile terminal 200, and transmits the operation prohibition degree N to the authentication ECU 10 (step S102).

The restriction control portion 13 of the authentication ECU 10 determines that the transmitted operation prohibition level N is one of 1 to 3. Specifically, the restriction control portion 13 determines whether the transmitted operation prohibition level N is 3 (N=3) or not (step S103). When the operation prohibition level N is 3, the restriction control portion 13 sets a driving operation restriction state of the vehicle 500 at the third state R (step S130).

The third state R is a state in which running of the vehicle 500 has been permitted as described above, i.e. a restriction release state in which the restriction on the driving operation of the vehicle 500 has been released.

TABLE 1

| Priority | Level N | Vehicle State | Shift Operation | Vehicle Start-UP | Power Supply (IG) ON | Warning Notification | State |
|---|---|---|---|---|---|---|---|
| 1 | Level 0 (Permitted) | * | Prohibited | Prohibited | Permitted | No | P |
| 2 | Level 1 | During Stop | Prohibited | Prohibited | Permitted | No | |
| 3 | Level 1 | After Start-Up | Prohibited | Prohibited | Permitted | Yes | |
| 4 | Level 2 | During Stop | Prohibited | Permitted | Permitted | No | Q |
| 5 | Level 2 | After Start-Up | Prohibited | Permitted | Permitted | Yes | |
| 6 | Level 3 | During Stop | Permitted | Permitted | Permitted | No | R |
| 7 | Level 3 | After Start-Up | Permitted | Permitted | Permitted | No | |
| 8 | Other Than the Above | | Permitted | Permitted | Permitted | No | |

The handsfree communication portion 40 has a calling function which can perform handsfree calling through the mobile terminal 200.

When a user makes handsfree calling, the handsfree communication portion 40 performs communication with the mobile terminal 200 not through the restriction control portion 13. Accordingly, the handsfree communication portion 40 can provide the calling function of the mobile terminal 200 regardless of the operation prohibition level N.

The display portion 30 is a meter portion for displaying various information about the vehicle 500 such as a running state of the vehicle 500 and the driving operation restriction state of the vehicle 500. The display portion 30 has a warning function to notify the user of warning that the operation of the mobile terminal 200 should be prohibited. The warning is informed when the operation prohibition level N has been decreased to 2 or lower in the third state R in which running of the vehicle 500 can be performed.

In this manner, the display portion 30 displays warning when the operation prohibition level N has been relaxed into a level lower than the restriction degree on the driving operation of the vehicle 500 during running of the vehicle 500.

A method for restricting the driving operation of the vehicle 500 using the vehicle control system 100 configured as described above will be described with reference to FIG. 3.

First, on condition that the mobile terminal 200 has been moved into the vehicle or the vicinity of the vehicle 500 where the mobile terminal is communicatable with the Similarly, when having determined in the step 103 that the operation prohibition level N is not 3 (N≠3), the restriction control portion 13 determines whether the operation prohibition level N of the mobile terminal 200 is 2 (N=2) or not (step S104).

When having determined in the step S104 that N=2, the restriction control portion 13 further makes communication with the powertrain control ECU 20 and determines whether the current state of the vehicle 500 is a state after start-up or not (step S105).

On condition that it has been determined in the step S105 that the vehicle 500 is in the state after start-up, the display portion 30 displays warning (step S106).

When having determined in the step S105 that the state of the vehicle 500 is not after start-up, i.e. only the main power supply is in an On state, the restriction control portion 13 sets the restriction state of the driving operation of the vehicle 500 at the second state Q (step S120).

The second state Q is a state in which the start-up of the vehicle 500 is permitted but shift change is prohibited and running of the vehicle 500 is restricted, i.e. a shift operation restriction state.

When having determined in the step S104 that N≠2, the restriction control portion 13 determines whether the operation prohibition level N of the mobile terminal 200 is 1 (N=1) or not (step S107).

When having determined in the step S107 that N=1, the restriction control portion 13 further performs communication with the powertrain control ECU 20, and determines whether the current state of the vehicle 500 is a state after start-up or not (step S108).

On condition that it has been determined in the step S108 that the vehicle 500 is in the state after start-up, the display portion 30 displays warning (step S109).

When having determined in the step S108 that the state of the vehicle 500 is not after start-up, i.e. only the main power supply is in an On state, the restriction control portion 13 sets the driving operation restriction state of the vehicle 500 at the first state P (step S110).

The first state P is a state in which only the On state of the main power supply of the vehicle 500 is permitted but the shift change and the running are restricted, i.e. a start-up restriction state.

In the embodiment, the operation prohibition level N of the mobile terminal 200 is regarded as one of 1, 2 and 3 (N=1, 2, or 3) as shown in Table 1. However, the operation prohibition level N may be set more finely, or one may be selected from two choices indicating whether the operation prohibition has been performed or not. Any index may be used as the operation prohibition level N as long as the operation restriction state of the mobile terminal 200 imposed by the operation restricting portion 203 can be determined in accordance with the index.

The case where the authentication ECU 10 is paired with only one mobile terminal 200 has been described in the embodiment. However, when a plurality of mobile terminals 200 are moved into the vehicle 500 or the vicinity of the vehicle, the authentication ECU 100 may communicate with the mobile terminals 200 respectively.

When a plurality of mobile terminals 200 are within a communicable range with the vehicle 500, the restriction control portion 13 refers to an operation prohibition level N of at least one of the mobile terminals 200 to thereby restrict driving operation of the vehicle 500 in accordance with the referred operation prohibition level N.

Specifically, when the operation prohibition level N of one of the mobile terminals 200 is 3 (N=3) and the operation prohibition level N of another of the mobile terminals 200 is 1 (N=1), the restriction control portion 13 sets the vehicle 500 at the third state R.

In the embodiment, the operation restricting portion 203, the prohibition degree calculating portion 202 and the restriction control portion 13 are provided. The operation restricting portion 203 restricts operation of the mobile terminal 200. The prohibition degree calculating portion 202 determines a restriction state imposed by the operation restricting portion 203. The restriction control portion 13 controls the vehicle 500 in accordance with the determination of the prohibition degree calculating portion 202.

With such a configuration, operation of the driver on the mobile terminal 200 can be restricted properly.

In addition, in the embodiment, the vehicle 500 has the display portion 30 which notifies the driver of information about the vehicle 500. The display portion 30 displays warning when the operation prohibition level N has been relaxed to be lower than the restriction degree on the driving operation of the vehicle 500 during running of the vehicle 500. With such a configuration, operation of the driver on the mobile terminal 200 is restricted to prompt the driver to concentrate on the driving operation.

The restriction control portion 13 sets the operation restriction state of the vehicle 500 at one of the first state P, the second state Q and the third state R based on the operation prohibition level N. The first state P is a state in which start-up of the vehicle 500 is prohibited. The second state Q is a state in which the start-up is permitted but running of the vehicle 500 is restricted. The third state R is a state in which running of the vehicle 500 can be performed.

With the configuration, operation of the driver on the mobile terminal 200 can be restricted properly.

In the embodiment, the handsfree communication portion 40 which can perform handsfree calling using the mobile terminal 200 is provided. When the handsfree calling is performed by the handsfree communication portion 40, the handsfree calling can be performed using the mobile terminal 200 regardless of the operation prohibition level N.

With the configuration, operation of the driver on the mobile terminal 200 can be restricted properly.

Although the preferable embodiment of the invention has been described above, the invention is not limited to such a specific embodiment. Various modifications and changes can be made within the scope of the gist of the invention as long as there is no particular limitation in the aforementioned description.

For example, although the state of the vehicle 500 is determined after the operation prohibition level of the mobile communication terminal 200 has been determined in the embodiment, the restriction state of the vehicle may be changed in accordance with the operation prohibition level after the state of the vehicle 500 has been determined.

In addition, the mobile communication terminal 200 has the prohibition degree calculating portion 202 and transmits the operation prohibition level to the authentication ECU 10 in the embodiment. However, the prohibition degree calculating portion 220 may be provided in the authentication ECU 10 alternatively. In this case, the authentication ECU 10 serves as a determination portion which receives information such as a lock state from the mobile communication terminal 200, to thereby determine a restriction state based on the received information.

Only the most suitable effects which can be obtained from the invention are merely enumerated as effects described in the embodiment of the invention. It should be however noted that the effects of the invention are not limited to those described in the embodiment of the invention.

What is claimed is:

1. A vehicle control system for controlling a vehicle based on information from a mobile communication terminal, the system comprising:
    an operation restricting portion that restricts operation to the mobile communication terminal;
    a determination portion that determines a restriction state of the operation, among a plurality of restriction states, to the mobile communication terminal imposed by the operation restricting portion; and
    a power train vehicle control portion that controls the vehicle based on the determined restriction state of the operation of the mobile communication terminal.

2. The vehicle control system according to claim 1, wherein the determination portion determines one of a plurality of degrees of restriction on an operation of the vehicle based on an operation restriction state of the mobile communication terminal; and
    the vehicle is controlled based on the determined degree.

3. The vehicle control system according to claim 2, wherein the vehicle has a display portion which notifies information about the vehicle; and
    the display portion outputs warning when the operation restriction state is changed to from one degree of restriction to another degree of restriction during running of the vehicle.

4. The vehicle control system according to claim 3, further comprising:

a handsfree communication portion which provides handsfree calling using the mobile communication terminal, wherein the handsfree calling is usable with the mobile communication terminal regardless of the restriction state.

5. The vehicle control system according to claim 3, where the determination portion sets a current state of the vehicle at one of a first state, a second state and a third state based on the determined degree, the first state being a state in which a start-up of the vehicle is prohibited, the second state being a state in which the start-up is permitted while a running of the vehicle is restricted, the third state being a state in which the running of the vehicle can be performed.

6. The vehicle control system according to claim 5, further comprising:

a handsfree communication portion which provides handsfree calling using the mobile communication terminal, wherein the handsfree calling is usable with the mobile communication terminal regardless of the restriction state.

7. The vehicle control system according to claim 2, further comprising:

a handsfree communication portion which provides handsfree calling using the mobile communication terminal, wherein the handsfree calling is usable with the mobile communication terminal regardless of the restriction state.

8. The vehicle control system according to claim 2, where the determination portion sets a current state of the vehicle at one of a first state, a second state and a third state based on the determined degree, the first state being a state in which a start-up of the vehicle is prohibited, the second state being a state in which the start-up is permitted while a running of the vehicle is restricted, the third state being a state in which the running of the vehicle can be performed.

9. The vehicle control system according to claim 8, further comprising:

a handsfree communication portion which provides handsfree calling using the mobile communication terminal, wherein the handsfree calling is usable with the mobile communication terminal regardless of the restriction state.

10. The vehicle control system according to claim 1, further comprising:

a handsfree communication portion which provides handsfree calling using the mobile communication terminal, wherein the handsfree calling is usable with the mobile communication terminal regardless of the restriction state.

11. The vehicle control system according to claim 1, wherein the power train vehicle control portion controls the vehicle to prohibit a shift operation of the vehicle based on the determined restriction state.

12. The vehicle control system according to claim 1, wherein the power train vehicle control portion controls the vehicle to restricts a start-up of the vehicle based on the determined restriction state.

* * * * *